(12) United States Patent
Nikain (10) Patent No.: US 10,142,694 B2
(45) Date of Patent: *Nov. 27, 2018

(54) METHOD AND APPARATUS FOR SHARING MEDIA CONTENT (71) Applicant: AT&T INTELLECTUAL PROPERTY I, L.P., Atlanta, GA (US)

(72) Inventor: Mohammad Nikain, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,570

(22) Filed: Mar. 13, 2017

(65) Prior Publication Data

US 2017/0188107 A1    Jun. 29, 2017

Related U.S. Application Data

(63) Continuation of application No. 14/865,486, filed on Sep. 25, 2015, now Pat. No. 9,628,526, which is a (Continued)

(51) Int. Cl.
*H04N 21/472* (2011.01)
*G06F 17/30* (2006.01)
(Continued)

(52) U.S. Cl.
CPC ....... *H04N 21/47217* (2013.01); *A63F 13/10* (2013.01); *A63F 13/335* (2014.09); *G06F 17/30873* (2013.01); *H04L 65/4069* (2013.01); *H04L 65/4092* (2013.01); *H04N 21/25816* (2013.01); *H04N 21/25875* (2013.01); *H04N 21/4756* (2013.01); *H04N 21/4788* (2013.01); *H04N 21/6587* (2013.01);
(Continued)

(58) Field of Classification Search
CPC ............ H04L 65/4092; H04N 21/6587; H04N 21/47217
See application file for complete search history.

(56) References Cited

U.S. PATENT DOCUMENTS

5,809,250 A    9/1998  Kisor
6,699,127 B1   3/2004  Lobb
(Continued)

*Primary Examiner* — Ramy M Osman
(74) *Attorney, Agent, or Firm* — Guntin & Gust, PLC; Joseph Hrutka (57) ABSTRACT

A method that incorporates teachings of the subject disclosure may include, for example, receiving a plurality of operating commands for controlling a first presentation of media content by a first media processor device at a first display device to generate a first viewing experience and transmitting the playback file to a second media processor device via a first network, where a second presentation of the media content by the second media processor device at a second display device according to the plurality of operating commands of the playback file recreates the first viewing experience at the second display device and where the first and second media processor devices are members of the first network based upon common membership in a social media network by a first subscriber associated with the first media processor device and a second subscriber associated with the second media processor device. Other embodiments are disclosed.

20 Claims, 7 Drawing Sheets

Related U.S. Application Data continuation of application No. 13/671,949, filed on Nov. 8, 2012, now Pat. No. 9,171,090.

(51) Int. Cl.
  *A63F 13/40* (2014.01)
  *A63F 13/335* (2014.01)
  *H04N 21/258* (2011.01)
  *H04N 21/475* (2011.01)
  *H04N 21/4788* (2011.01)
  *H04N 21/6587* (2011.01)
  *H04L 29/06* (2006.01)
  *H04N 21/81* (2011.01)
  *H04L 29/08* (2006.01)

(52) U.S. Cl.
  CPC .... *H04N 21/8133* (2013.01); *A63F 2300/634* (2013.01); *H04L 65/1016* (2013.01); *H04L 65/4084* (2013.01); *H04L 67/02* (2013.01); *H04L 67/104* (2013.01)

(56) References Cited

U.S. PATENT DOCUMENTS

| | | |
|---|---|---|
| 6,863,608 B1 | 3/2005 | LeMay et al. |
| 7,428,698 B2 | 9/2008 | Bodin et al. |
| 7,908,321 B1 | 3/2011 | Rust |
| 8,145,705 B1 | 3/2012 | Rust |
| 8,341,227 B2 | 12/2012 | Chen et al. |
| 8,595,305 B2 | 11/2013 | Chen et al. |
| 8,949,873 B1 | 2/2015 | Bayer et al. |
| 9,171,090 B2 | 10/2015 | Nikain |
| 9,462,455 B2 | 10/2016 | Rodzevski et al. |
| 9,628,526 B2 * | 4/2017 | Nikain ................ H04L 65/4092 |
| 2004/0073644 A1 | 4/2004 | Koch et al. |
| 2006/0002681 A1 | 1/2006 | Spilo et al. |
| 2006/0148571 A1 | 7/2006 | Hossack et al. |
| 2007/0100952 A1 | 5/2007 | Chen et al. |
| 2008/0086754 A1 | 4/2008 | Chen et al. |
| 2008/0209021 A1 | 8/2008 | Shamma |
| 2008/0263591 A1 | 10/2008 | de Heer |
| 2008/0317439 A1 | 12/2008 | Wong et al. |
| 2009/0002477 A1 | 1/2009 | Cutler |
| 2010/0122306 A1 | 5/2010 | Pratt et al. |
| 2010/0242074 A1 | 9/2010 | Rouse |
| 2011/0107382 A1 | 5/2011 | Morris et al. |
| 2011/0126251 A1 | 5/2011 | LaFreniere et al. |
| 2011/0239253 A1 | 9/2011 | West et al. |
| 2012/0226817 A1 | 9/2012 | Woxblom et al. |
| 2013/0103814 A1 | 4/2013 | Carrasco et al. |
| 2013/0205021 A1 | 8/2013 | Hall et al. |
| 2013/0326576 A1 | 12/2013 | Zhang et al. |
| 2014/0006415 A1 | 1/2014 | Rubchinsky |
| 2014/0129630 A1 | 5/2014 | Nikain et al. |
| 2014/0228118 A1 | 8/2014 | Hardy et al. |
| 2014/0269757 A1 | 9/2014 | Park et al. |
| 2016/0014174 A1 | 1/2016 | Nikain |
| 2017/0188107 A1 * | 6/2017 | Nikain ............... H04N 21/6587 |

\* cited by examiner

METHOD AND APPARATUS FOR SHARING MEDIA CONTENT

CROSS-REFERENCE TO RELATED APPLICATIONS

This application is a continuation of U.S. patent application Ser. No. 14/865,486 filed Sep. 25, 2015, which is a continuation of U.S. patent application Ser. No. 13/671,949 filed Nov. 8, 2012 (now U.S. Pat. No. 9,171,090). All sections of the aforementioned applications are incorporated herein by reference in their entirety.

FIELD OF THE DISCLOSURE

The subject disclosure relates to a method and apparatus for sharing media content.

BACKGROUND

Media content is typically experienced by consumers via devices such as computers, televisions, radios, and mobile electronics. Media content is frequently delivered by service providers, who send the content, such as television, radio, and video programming, to consumers for enjoyment at their physical locations. Modern communication networks benefit from interconnectivity between consumers and various communication devices. Consumers typically experience media content via a display or presentation device. As network capabilities expand, these interconnections provide new opportunities to enhance the ability for consumers to enjoy media content by experiencing a variety of content over multiple devices. Intelligent devices offer new means for the enjoyment of content in ways that anticipate consumer desires, including the personalization of media content presentation. Networking capabilities provide unique opportunities to share content.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for determining a viewing orientation of a viewer at a viewing area, determining whether an attentiveness level of the viewer is below a threshold and, if so, performing an operation that is selected from a viewer profile based on the viewer orientation. Other embodiments are included in the subject disclosure.

One embodiment of the subject disclosure includes a memory storing computer instructions and a processor coupled to the memory. The processor can perform operations responsive to executing the computer instructions including establishing communications with a first network comprising a plurality of media processor devices. The processor can also perform operations for receiving media content from a second network and for receiving a plurality of operating commands for controlling presentation of the media content at a first display device. The processor can further perform operations for presenting the media content at the first display device according to the plurality of operating commands to generate a first viewing experience. The processor can perform operations for logging the plurality of operating commands to generate a playback file associated with the media content. The processor can further perform operations for transmitting the playback file to a media processor device of the plurality of media processor devices via the first network. A presentation of the media content by the media processor device at a second display device according to the plurality of operating commands of the playback file can recreate the first viewing experience at the second display device.

One embodiment of the subject disclosure includes a tangible computer-readable storage medium including computer instructions, which, responsive to being executed by at least one processor, can cause the at least one processor to perform operations including receiving at a first media processor device a plurality of operating commands for controlling presentation of media content at a first display device. The computer instructions can, in turn, include presenting the media content at the first display device according to the plurality of operating commands to generate a first viewing experience. The computer instructions can include logging the plurality of operating commands to generate a playback file associated with the media content. The computer instructions can further include transmitting the playback file to a second media processor device via a first network. A presentation of the media content by the second media processor device at a second display device according to the plurality of operating commands of the playback file can recreate the first viewing experience at the second display device One embodiment of the subject disclosure includes a method including receiving, by a system comprising a processor, a plurality of operating commands for controlling a first presentation of media content by a first media processor device at a first display device to generate a first viewing experience. The method further includes transmitting, by the system, the playback file to a second media processor device via a first network. A second presentation of the media content by the second media processor device at a second display device according to the plurality of operating commands of the playback file can recreate the first viewing experience at the second display device. The first and second media processor devices are members of the first network based upon common membership in a social media network by a first subscriber associated with the first media processor device and a second subscriber associated with the second media processor device.

Figure 1:
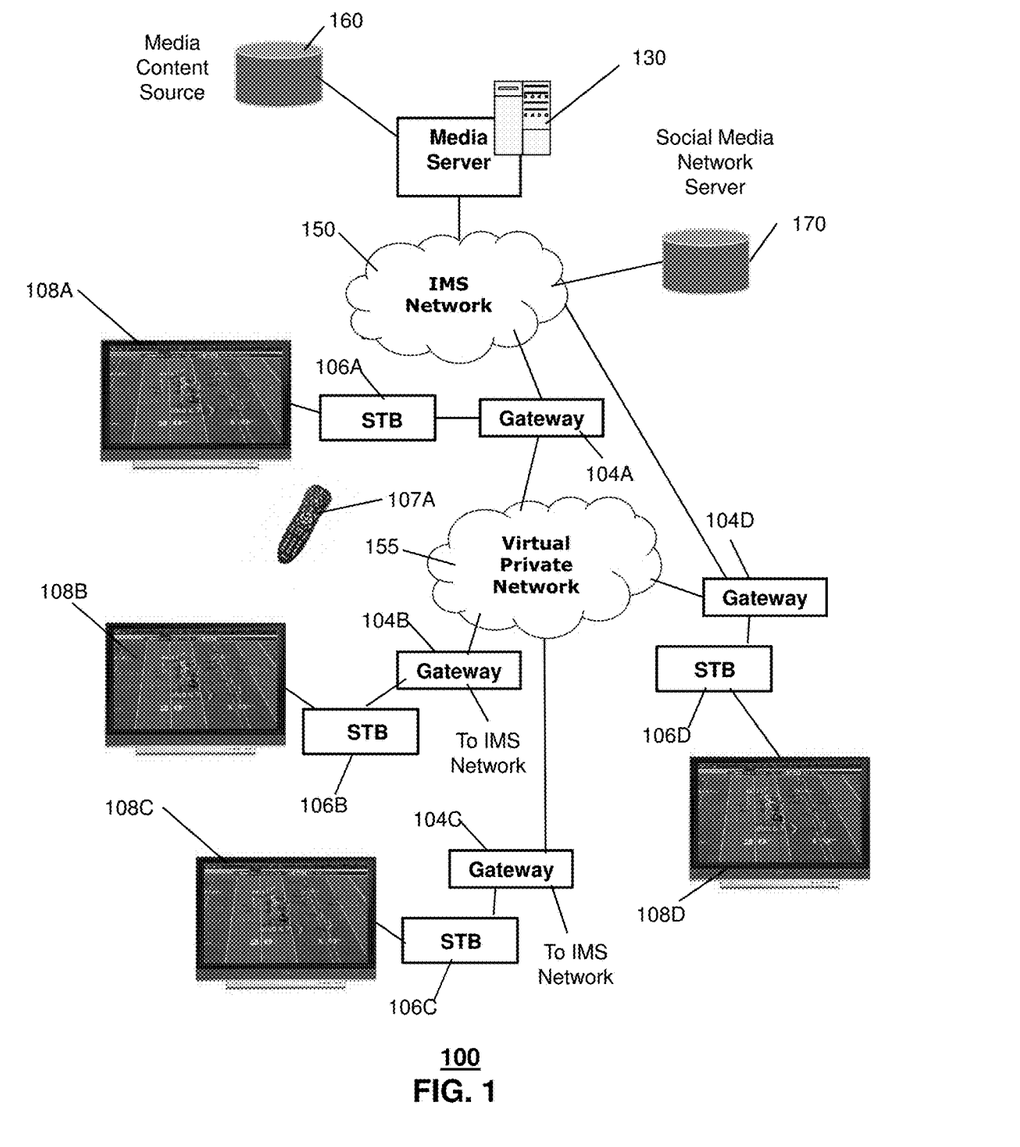
FIG. 1 depicts an illustrative embodiment of a system that can be utilized for sharing personalized presentations of media content.

FIG. 1 depicts an illustrative embodiment of a system 100 that can be utilized for sharing personalized presentations of media content. The system 100 can comprise equipment for providing media content for personalized presentation to a viewer and can be further utilized for sharing with other viewers this personalized viewing method for the presentation. The system 100 can also be used to link presentation devices, such as media processor devices 106A-D in a private network for sharing personalized presentation information.

In one embodiment, a media server 130 can receive media content from a media content source 160 and provide this media content to one or more media processor devices 106A. The media server 130 and the medic content source 160 can be a part of a subscription content service, such as cable, satellite, or DSL based media content delivery system. The media content can be any type of viewable content, such as broadcast television, cable or premium television, video on demand, or pay-per-per view television. The media server 130 can deliver the media content to the media processor devices 106A-D by means of a communication network 150. In one embodiment, the media server 130 delivers media content by utilizing an internet protocol compatible, multimedia subsystem (IMS) network architecture 150. In other embodiments, the media server 130 can deliver media content by a private communication network, a public communication network, such as the World Wide Web. In other embodiments, the media server 130 can deliver media content over any type of transport media, such as a satellite link, a cable line, and/or a fiber optic network.

The media content can be received at the media processor devices 106A-D by a gateway device 104A-D. In one embodiment, each gateway device 104 can function as an interface between an IMS network 150 and one or more media processor devices 106A-D each located at, for example, premises of a subscriber to a media service provider. In one embodiment, each gateway device 104A can provide internetworking functions, such as protocol translation, impedance matching, data rate conversion, and/or fault isolation necessary for exchanging data between the external network 150 and the media processor device 106. Each subscriber premises can have a separate gateway 104A-D and one or more display devices 108A-D for presenting the media content to the subscriber or to other viewers.

A media processor device 106A can be utilized at the viewing premises to present the media content at a display device 108A. The media processor device 106A can be, for example, a set-top box, a computer device, or a mobile device. The media processor device 106A and the display device 108A can be integrated into a single device, such as a television with a built in set-top box or a mobile device with integrated media processor functionality. Each media processor device 106A can receive the media content as encoded data packet streams and can decode the received data streams into decoded stream that can be delivered to the display device 108A for presentation. In other embodiments, the media processor device 106A can further perform functions of providing an electronic programming guide for selection of programming from the media server 130, authentication of the media processor device 106A for reception of media content, storage and updating of user preferences, and/or parental control of media content. The media processor device 106A can be controlled utilizing a remote controller device 107A. In one embodiment, the media processor device 106A can cause the received media content to be presented at a display device 108A that is visible to the viewing area at the subscriber's premises.

In one embodiment, the media processor device 106A can receive user command inputs from the remote controller 107A. The command inputs can control media processor device 106A functions for presentation of the media content. For example, the remote controller 107A can control starting a media presentation by selecting the media content from an electronic programming guide (EPG) or by enabling a PLAY function from a digital video recording (DVR) module at the media processor device 106A. The media processor device 107A can receive these remote commands over a wireless interface and can convert these commands into operational actions. In other embodiments, the media processor device 106A can similarly process and execute operational commands for stopping, pausing, skipping, fast forwarding, and/or repeating portions of the media content. In another embodiment, the media control processor 106A can perform commands to adjust a presentation volume, to mute or unmute the presentation speakers, and/or to select a picture characteristic such screen resolution or aspect ratio.

Figure 2:
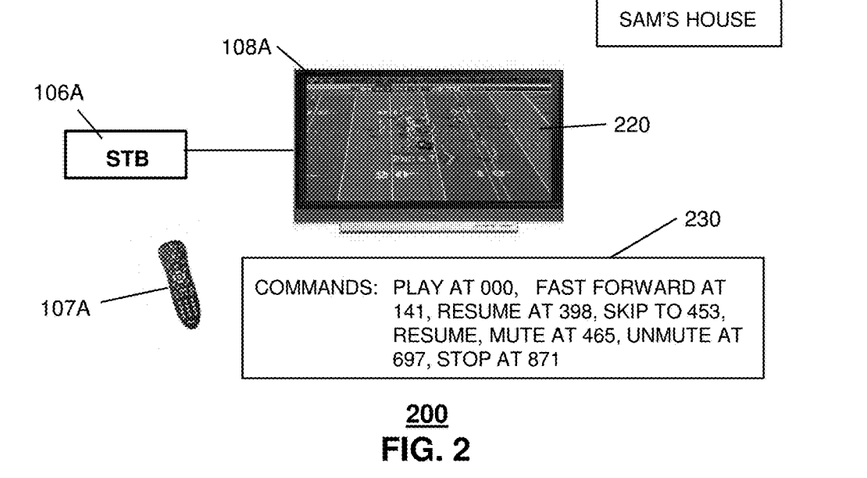
FIGS. 2-4 depict illustrative embodiments of logging operational commands during presentation of media content to create a shareable playback file that can be shared and experienced by another viewer utilizing the system of FIG. 1.

Each operational command affects how a viewer at the display device 108A experiences the media content. For example, if the viewer determines, for any reason, that only the first ten minutes of a television program are of interest, then the viewer may, first, command the media processor device to PLAY the program from the beginning and, then, to STOP and QUIT the program at the end of the first ten minutes. Referring to FIG. 2, a viewer can enter several commands during the presentation of the media content. For example, during a presentation of a football game, the viewer can enter a series of commands that alter or control the presentation. In one embodiment, the media processor device 106A can log this sequence of command and store the logged sequence as a playback file 230. If, at a later time, the viewer decided to view the program again, then the viewer could select the stored playback file 230 using, for example, the electronic programming guide. The media processor device 106A can then execute the playback file to cause a replaying of the media content precisely as it was watched the first time. In one embodiment, the playback file 230 can be stored locally at the media processor device 106A. In another embodiment, the playback file 230 can be stored at the media server 130 or at another network resource configured for this task.

In one embodiment, the playback file 230 can be encoded as addition information, or metadata, and embedded in the media content. For example, if the media content is stored at a local DVR module at the media processor device 106A, then the playback information can be included as metadata with the stored media content. In another embodiment, if the media content is not stored locally, then the media processor device 106A can attempt to locate the media content whenever the playback file is initiated. For example, if a viewer selects the playback file 230 from an electronic programming guide, then the media processor device 106A can search a local DVR, if used, to determine if the media content is available locally for immediate presentation. If the media content is not available locally, then the media processor device 106A can search the electronic programming guide to determine if the media content is scheduled for broadcast. In another embodiment, available video-on-demand (VOD) channels and/or internet-accessible sources can be searched.

In one embodiment, the playback file 230 can be stored at, or shared with, another media processor device 106C. For example, a first media processor device 106A at a home of a first subscriber (Sam) could log and store a sequence of commands Sam used while watching a football game 220.

Figure 3:
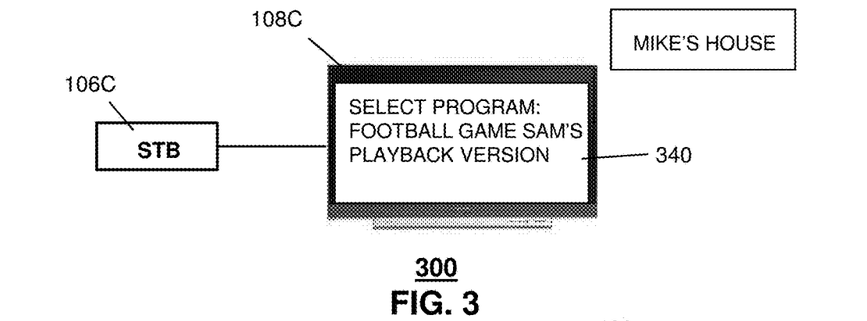
Figure 4:
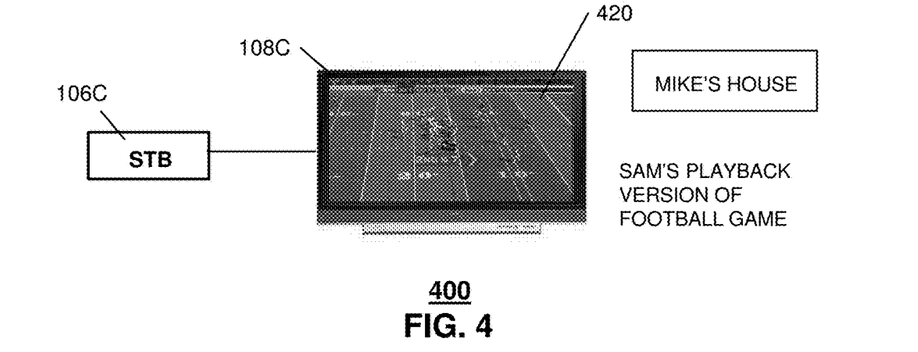

Referring to FIG. 3, in one embodiment, the first media processor device 106A can send a playback file, including the sequence of operational commands, to a second media processor device 106C that is located at Mike's house. In one embodiment, the viewer or subscriber at Mike's house can access the playback file using an electronic programming guide 340 running at the second media processor device. 106C. For example, the electronic programming guide 340 can describe the available playback file and/or can list the playback file as an option for viewing the media content. For example, the football game may be scheduled for rebroadcast or may be recorded on a DVR module at the second media processor device 106C. The viewer at Mike's house can browse the electronic programming guide for instances of the football game. In one embodiment, for each instance of the football game, the electronic programming guide can list "Sam's Playback Version" as an optional viewing method for the game. Referring to FIG. 4, if the viewer selects the stored playback version, then the third media player device 106C executes the playback file 230 to cause the media content 420 to be presented as it was presented at Sam's house. The viewing experience at Sam's House can thereby be recreated at Mike's house.

In one embodiment, the playback file can be shared between the media processor devices 106A and 106D using a virtual private network (VPN) 155. In one embodiment, the media processor devices 106A-D can receive media content from the media server 130 through the IMS network 150. However, any media processor device 106A-D participating in the virtual private network 155 can share information with other participating media processor devices 106A-D. In one embodiment, the virtual private network 155 can function as a peer-to-peer network where each media processor device 106A-D can communicate directly with and/or exchange data directly with another media processor device in the virtual network 155. In one embodiment, the virtual private network can maintain privacy of communications between the participating media processor devices 106A-D.

In one embodiment, a social media network server 170 can provide a social media network function to the system 100. In one embodiment, the social media network 170 can include one or more subscribers to the media content service provider that provides content through the media server 130. For example, a subscriber or viewer associated with a media processor device 106A can have an account with a social media network 170. In one embodiment, this subscriber can participate in one or more social media network groups. In another embodiment, the subscriber can register or otherwise indicate to the social media network 170 that the subscriber owns or is otherwise associated with a media processor device 106A. For example, the subscriber can indicated to the social media network 170 that the subscriber participates in a service provider plan. The social media network 170 can collect similar indicators from many members of the social network.

In one embodiment, the social media network 170 can determine which members of the social network participate in service provider plans that support data sharing between media processor devices 106A-D and which of these members are jointly members of one or more groups in the social network. For example, if subscribers Sam and Mike each participate in the social media network 170 and have each indicated to the social network that they have media processor devices 106A and 106C that are capable of sharing data in a peer-to-peer fashion over the virtual private network, then the social media network 170 can assist in the formation of peer-to-peer groups. In one embodiment, the social media network 170 can send invitations to media processor devices 106A and 106C that have been registered with the social network. In one embodiment, the invitations include a security token, or key, from the social network 170 and a request for authenticating information to be provided along with an acceptance of the offer to join the virtual private network 155. In one embodiment, the acceptance can be sent to the social media network server 170. In another embodiment, the acceptance can be sent to the media server device 130. In another embodiment, the acceptance is sent to one or more current members of the virtual private network 155. The acceptance can be authenticated by any of the receiving devices. In one embodiment, subscriber authentication information can be digitally signed using a security key and then verified against a digital certificate by the social media network 170.

In one embodiment, the media processor device 106A can grade the viewing experience of a subscriber or viewer who is viewing the media content using the media processor device 106A. The media processor device 106A can evaluate one or more factors to determine a user rating for the media content. In one embodiment, the media processor device 106A can track how long the viewer physically watched the program in terms of total time and percentage of the total program length. Viewing time can be associated with a viewer rating. For example, viewing the entire media content or viewing the media content for an entire hour can be used to infer that the viewer probably liked the program. Conversely, a short viewing time or a viewing time that represents only a small percentage of the overall program time can be used to infer that the viewer probably did not like the program. In another embodiment, the media processor device 106A can evaluate the operational command inputs by the viewer to infer the viewer's attitudes about the media content. For example, incidents where the viewer rewinds and replays sections of the program or where the viewer turns up the volume can indicate user acceptance of the media content. Conversely, incidents where the viewer skips large sections of the program can infer less than ideal acceptance of the program. In one embodiment, the media processor device 106A can convert the analysis of the log of the operating commands into a viewer rating. In another embodiment, the media processor device 106A can capture viewer ratings directly by requesting viewer input. For example, the media processor device 106A can present a user interface at the media display device 108A requesting that the viewer rate the content according to a binary scale, such as like or dislike, or a multiple level scale.

In one embodiment, the captured or derived viewer rating of the can be included as part of the playback file. In another embodiment, the viewer rating can be kept as in a separate file and/or database for sharing with other viewers independently from the playback file. For example, a first media processor device 106A can capture and/or derive viewer rating information for a media program, such as a movie. The viewer rating information can be shared with a second media processor device 106D over the virtual private network 155. The viewer rating information can be shared as part of a playback file generated by the first media processor device 106A for this movie or can be shared as a separate file or as part of a database of viewer ratings for other media programs.

In one embodiment, the viewer rating information can be accessed and presented by at the second media processor device 106D using an electronic programming guide. In one embodiment, an electronic programming guide at the second media processor device 106D can present the rating information wherever the movie is listed in the guide. For example, if the movie is scheduled to be presented at 8 pm on the following Monday evening, then listing for the movie on that day and time can include an indicator of a viewer rating. For example, viewer rating can be presented in the main guide window or can be accessible under a pop up window. In one embodiment, the media processor device 106D can combine and display multiple viewer ratings of a media program. For example, the second media processor device 106D can display viewer ratings for the same movie that has been viewed by one viewer at the first media processor device 106A and by another viewer at a third media processor device 106B. The multiple ratings can be listed by the electronic programming guide. In one embodiment, the ratings can be statistically combined, such as by calculating a percentage, a mean, a median, and/or a range.

In one embodiment, the media processor device 106D can provide a means for accessing viewer rating information at the electronic programming guide according to a search limitation. For example, the ratings information can be searched for all ratings originating from a specific identifier associated with a media processor device 106A. Whenever a rating is generated by a media processor device 106A, the rating can be associated with an identifier unique to the device 106A. When the rating is shared with other media processor devices 106B-D over the private network 155, the identifier can be accessed by electronic programming guides at these devices. The identifier can be coded so that no personal information is conveyed. However, viewers at other media processor devices 106B-D can associated ratings with specific identifiers and gauge how much these ratings agree or disagree with the viewer's own experience. In this way, the viewer can associate identifiers as particularly helpful for determining their own viewing decisions. In another embodiment, the electronic programming guide can search for positive or negative ratings, ratings associated with particular media programs or genres, and for ratings that are of recent acquisition. The search limitation can be used as a search term for finding specific ratings features or as a filtering term to eliminate specific ratings features.

In one embodiment, the media processor device 106A can share the derived ratings with the other media processor devices 106B-D of the virtual private network 155. In another embodiment, the derived ratings can be shared with the social media network server 170, where the ratings can be shared on-line with other members of the subscriber's social network group. In another embodiment, the viewer rating can simply be an indicator that the viewer has watched the media content.

Figure 5:
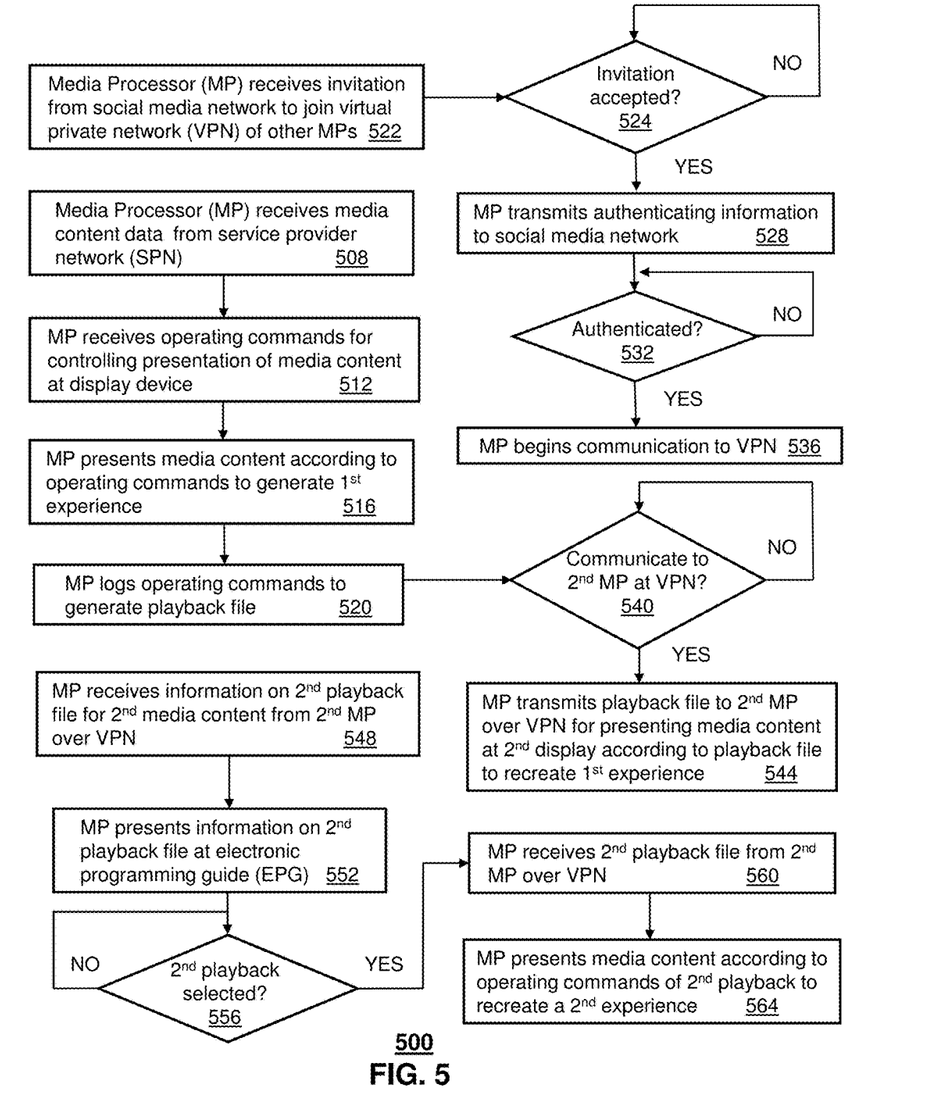
FIG. 5 depicts an illustrative embodiment of a method operating in portions of the system described in FIGS. 1-7.

FIG. 5 depicts an illustrative embodiment of a method operating in the systems and devices described in FIGS. 1-7. Method 500 can begin with step 508, in which the media processor device 106A can receive media content data from a service provider network. In one embodiment, a media server 130 can transmit media content data to the media processor device 106A. The media server 130 can deliver the media content to the media processor devices 106A-D. The media content can be received at the media processor devices 106A-D by a gateway device 104A-D.

In step 512, the media processor device 106A can receive operating commands for controlling presentation of the received media content at a media display device 108A. The command inputs can control media processor device 106A functions for presentation of the media content. For example, the remote controller 107A can control starting a media presentation by selecting the media content from an electronic programming guide (EPG) or by enabling a PLAY function from a digital video recording (DVR) module at the media processor device 106A. In other embodiments, the media processor device 106A can similarly process and execute operational commands for stopping, pausing, skipping, fast forwarding, and/or repeating portions of the media content. In another embodiment, the media control processor 106A can perform commands to adjust a presentation volume, to mute or unmute the presentation speakers, and/or to select a picture characteristic such screen resolution or aspect ratio.

In step 516, the media processor device 106A can present the media content at the media display device 108A according to the operating commands to generate a first viewing experience. In step 520, the media processor device 106A can log the operating commands to generate a playback file 230 that can be stored at the media processor device 106A. In one embodiment, the playback file 230 can be stored locally at the media processor device 106A. In another embodiment, the playback file 230 can be stored at the media server 130 or at another network resource configured for this task.

In step 522, the media processor device 106A can receive an invitation from a social media network 170 to join a virtual private network 155 including other media processor devices 106B-D. In one embodiment, a subscriber associated with the media processor device 106A can register or otherwise indicate to the social media network 170 that the subscriber owns or is otherwise associated with a media processor device 106A. In one embodiment, the social media network 170 can determine which members of the social network participate in service provider plans that support data sharing between media processor devices 106A-D, and which of these members are jointly members of one or more groups in the social network. In one embodiment, the social media network 170 can send invitations to media processor devices 106A and 106C that have been registered with the social network. In one embodiment, the invitations include a security token, or key, from the social network 170 and a request for authenticating information to be provided along with an acceptance of the offer to join the virtual private network 155.

In step 524, the media processor device 106A can accept the invitation. If the invitation is accepted in step 524, then, in step 528, the media processor device 106A can transmit authentication information to the social media network. In step 532, the media processor device 106A can determine if it has been authenticated. In one embodiment, subscriber authentication information can be digitally signed using a security key and then verified against a digital certificate by the social media network 170. If the media processor device 106A is authenticated in step 532, then, in step 536, the media processor device 106A can begin communicating with the virtual private network 155.

In step 540, the media processor device 106A can determine if the device 106A is communicating to a second media processor device 106B over the virtual private network 155. If the second media processor device 106B is found to be accessible in step 540, then, in step 544, the media processor device 106A can transmit the playback file 230 to the second media processor device 106B.

In another embodiment, in step 548, the media processor device 106A can receive information from the second media processor device 106B regarding a second playback file that has been logged from a presentation of second media content at the second media processor device 106B. In step 552, the media processor device 106A can present all of or a portion of the information from the second media processor 106B at an electronic programming guide 340. In one embodiment, the electronic programming guide 340 can describe the available playback file. In another embodiment, the electronic programming guide 340 can list the playback file as an option for viewing the media content. In step 556, the media processor device 106A can determine if the second playback file is selected and, if so, then, in step 560, the media processor device 106A can receive the second playback file from the second media processor device 106B. In step 564, the media processor device 106A can present the media content at a media display device 108A by using the second playback file to command the operation of media processor device 106A.

Upon reviewing the aforementioned embodiments, it would be evident to an artisan with ordinary skill in the art that said embodiments can be modified, reduced, or enhanced without departing from the scope of the claims below. For example, in one embodiment, the media content ratings, which are derived from the logged operational commands, can be shared with a third party. For example, the ratings can be sent to a third party server. In one embodiment, the ratings can be used by a third party to tailor and provide media content and/or advertising to one or more subscribers that are associated with the media processor devices 106A-D. For example, a third party can evaluate the viewer ratings. Where ratings indicated favorable response to media content, the third party can provide additional content to the media processor device of similar genre or associate with the same actors. Alternatively, the third party can target advertising to the media processor device based on analysis of the ratings. In one embodiment, the subscriber can be allowed to opt-in or to opt-out of sharing the ratings data. For example, a viewer at a media processor device may want to share ratings with other media processor devices over the private network but not share with third parties. The viewer can be enticed to share these ratings with the third party by offers of rewards, such as free access to content or services. In another embodiment, the media processor devices 106A-D can share the ratings with the social media network 170.

In another embodiment, the media processor device 106A can further be in communication with a second virtual private network, where the second virtual private network includes media processor devices that are within the same premises as the media processor device 106A. For example, a parent could watch an "R" rated movie while entering a series of operational commands using a remote control device 107. The parent could purposely skip over sections of the movie that are visually inappropriate for a minor and could mute the volume during inappropriate language. The saved playback file could then be shared with all of the media processor devices 106A at the premises. Minor children could then watch the "R" rated movie using the playback file such that the parent has effectively created an "edited for content" version of the movie.

Figure 6:
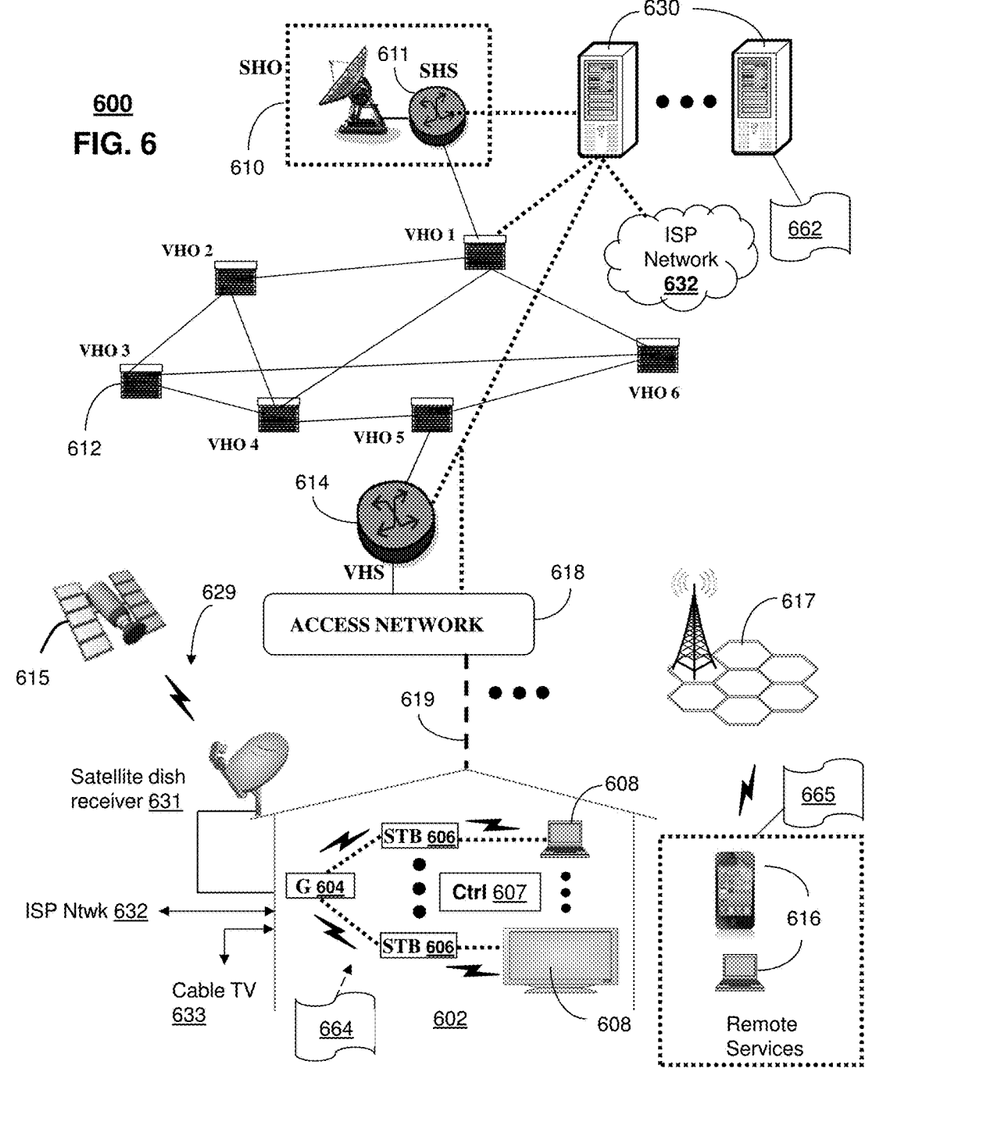
FIGS. 6-7 depict illustrative embodiments of communication systems that provide media services.

FIG. 6 depicts an illustrative embodiment of a first communication system 600 for delivering media content. The communication system 600 can represent an Internet Protocol Television (IPTV) media system. The communication system 600 can be utilized to provide media content to a media processor device 606 for presentation by a media display device 608. The system 600 can provide media content to media processor devices 606. Operation control commands at the media processor device 606 can be logged and stored as playback files. The playback files can be shared with other media processor devices 606 according to information at from a social media network. Media processor devices 606 that obtain the playback file and use the playback file to experience the media content as it was experienced at the originating media processor device.

The IPTV media system 600 can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a media server 630. The media server 630 can use computing and communication technology to perform function 662, which can include among other things, providing media content to one or more media processor devices 606. The media processors 606 and wireless communication devices 616 can be provisioned with software functions 664 and 665, respectively, to utilize the services of media server 630.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
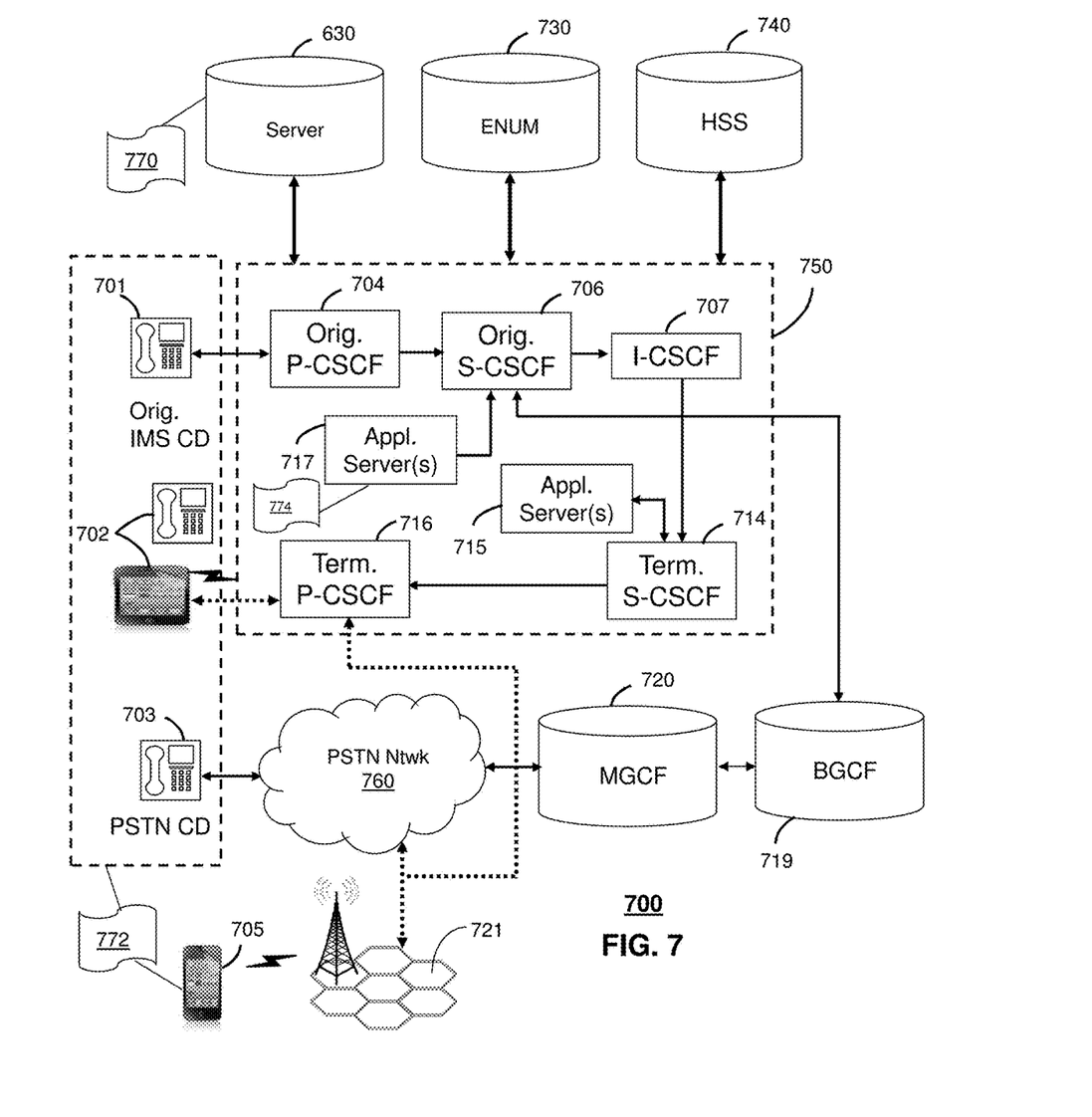

FIG. 7 depicts an illustrative embodiment of a communication system 700 employing IP Multimedia Subsystem (IMS) network architecture to facilitate the combined services of circuit-switched and packet-switched systems. Communication system 700 can be overlaid or operably coupled with communication system 600 as another representative embodiment of communication system 600. The communication system 600 can be utilized to provide media content to a media processor device 606 for presentation by a media display device 608. The system 700 can provide media content to media processor devices 606. Operation control commands at the media processor device 106 can be logged and stored as playback files. The playback files can be shared with other media processor devices 606 according to a virtual private network of media processor devices 606. The virtual private network included devices 106 selected according to information at a social media network. Media processor devices 606 that obtain the playback file and use the playback file to experience the media content as it was experienced at the originating media processor device.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media server 630 of FIG. 6 can be operably coupled to the second communication system 700 for purposes similar to those described above. Media server 630 can perform function 770 and thereby provide media services to the CDs 701, 702, 703 and 705 of FIG. 7. CDs 701, 702, 703 and 705, which can be adapted with software 772 to perform function 774 to utilize the services of the media server 630. Media server 630 can be an integral part of the application server(s) 717 performing function 770, which can be substantially similar to function 662 and adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 8:
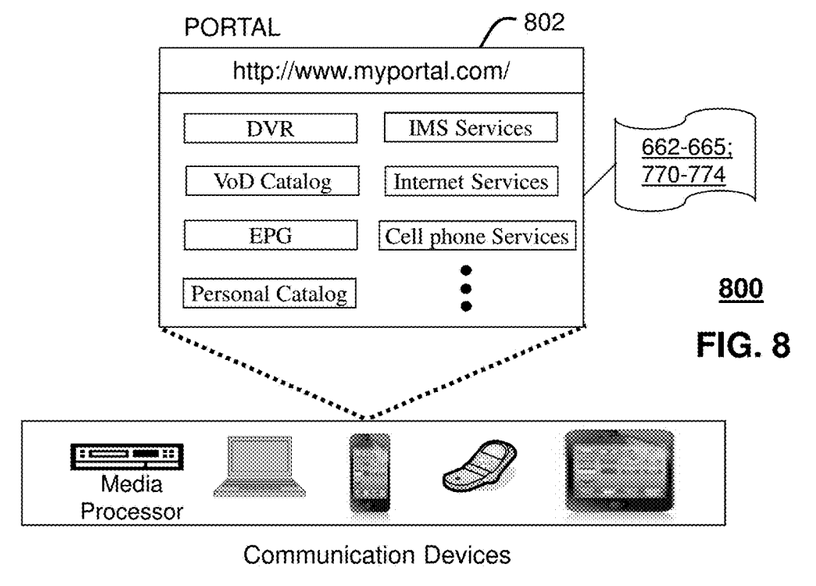
FIG. 8 depicts an illustrative embodiment of a web portal for interacting with the communication systems of FIGS. 1 and 6-7.

FIG. 8 depicts an illustrative embodiment of a web portal 802 which can be hosted by server applications operating from the computing devices 430 of the communication system 100 illustrated in FIG. 1. The communication system 700 can be utilized to provide media content to a media processor device 606 for presentation by a media display device 608. The web portal system 800 can be used to configure and maintain the viewer profile used for determining the predicted action for the viewer according to the viewing orientation and responsive to determining that the attentiveness level is below the threshold. For example, the viewer profile can correlate a plurality of prior actions with a plurality of prior viewing orientations.

The web portal 802 can be used for managing services of communication systems 600-700. A web page of the web portal 802 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 802 can be configured, for example, to access a media processor 106A and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106A. The web portal 802 can also be used for provisioning IMS services described earlier, provisioning Internet services, provisioning cellular phone services, and so on.

The web portal 802 can further be utilized to manage and provision software applications 662-665, and 770-774 to adapt these applications as may be desired by subscribers and service providers of communication systems 600-700.

Figure 9:
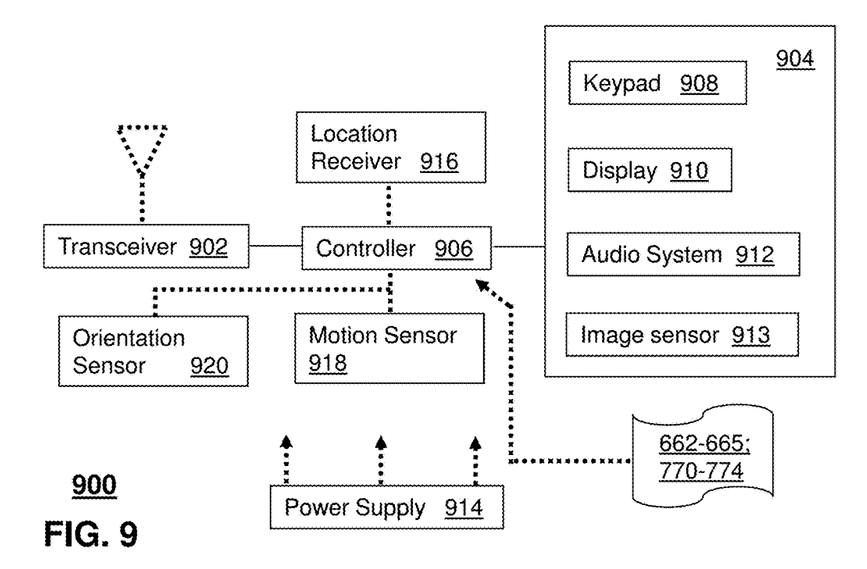
FIG. 9 depicts an illustrative embodiment of a communication device.

FIG. 9 depicts an illustrative embodiment of a communication device 900. Communication device 900 can serve in whole or in part as an illustrative embodiment of the devices depicted or otherwise described in FIGS. 1-8. The communication device 900 can be utilized to receive media content for display at a media display device 608 or can be used as the media display device 608. The communication device 900 can determine a viewing orientation of a first viewer in a viewing area from a plurality of images captured from the viewing area during a presentation of media content. The communication device 900 can further determine whether an attentiveness level of the first viewer during the presentation of the media content is below a threshold. The determination can be performed by, for example, correlating the viewing orientation with the presentation of the media content. A predicted action for the viewer can be accessed from a viewer profile associated with the viewer according to the viewing orientation and responsive to determining that the attentiveness level is below the threshold. For example, the viewer profile can correlate a plurality of prior actions with a plurality of prior viewing orientations. The communication device 900 can perform an operation associated with the presentation of the media content at a display according to the first action of the first viewer. The communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 400 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in communication systems 600-700 of FIGS. 6-7 such as a gaming console and a media player.

The communication device 900 shown in FIG. 9 or portions thereof can serve as a representation of one or more of the devices of communication systems 600-700. In addition, the controller 906 can be adapted in various embodiments to perform the functions 662-665 and 770-774, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
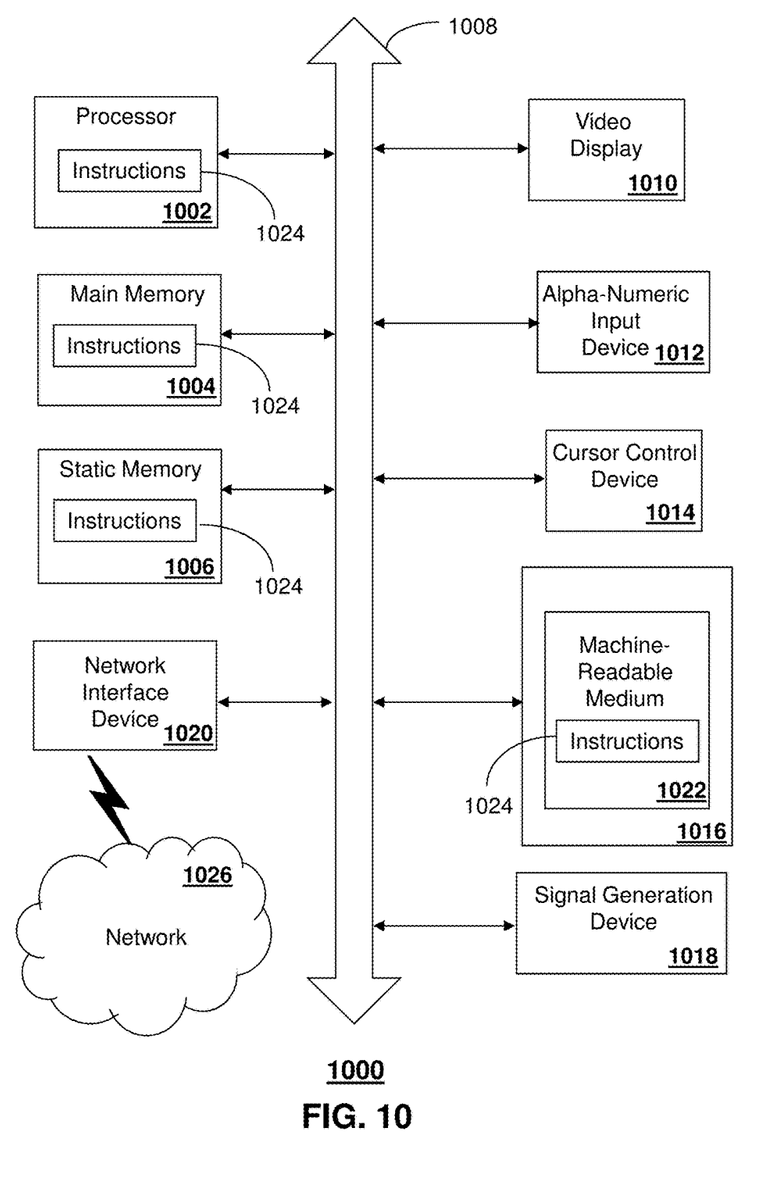
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods describe above. For example, the media processor device 106A, the media server device 130, the media server 170, the media display device 108, and/or the gateway device 104 can comprise a machine in the form of a computer system 1000. In some embodiments, the machine may be connected (e.g., using a network 1026) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display. The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure, including combinations of components and/or steps from the embodiments and/or methods described herein.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor device comprising:
a memory that stores computer instructions; and
a processor coupled to the memory, wherein the processor, responsive to executing the computer instructions, performs operations, the operations comprising:
    receiving a plurality of operating commands for controlling presentation of a selected media content, the selected media content being received from a server responsive to a selection, the selection being from a first electronic programming guide associated with the media processor device; and
    transmitting a playback file to another media processor device, wherein the playback file is associated with the selected media content and comprises the plurality of operating commands, wherein the another media processor device is distinct from the media processor device, wherein the another media processor device selects the playback file and the selected media content from a second electronic programming guide associated with the another media processor device, and wherein the another media processor device presents the selected media content according to the plurality of operating commands of the playback file.

2. The media processor device of claim 1, wherein the operations further comprise presenting the selected media content at a first display device associated with the media processor device according to the plurality of operating commands to generate a first viewing experience.

3. The media processor device of claim 2, wherein the another media processor device presents the selected media content at a second display device associated with the another media processor device in order to recreate the first viewing experience at the second display device.

4. The media processor device of claim 2, wherein the operations further comprise logging the plurality of operating commands to generate the playback file.

5. The media processor device of claim 4, wherein the operations further comprise storing the playback file at the media processor device.

6. The media processor device of claim 1, wherein the plurality of operating commands comprise one of starting, stopping, pausing, skipping, fast forwarding, repeating, adjusting a volume, muting, selecting picture characteristics, or any combinations thereof.

7. The media processor device of claim 1, wherein the media processor device and the another media processor device are part of a media processor device network.

8. The media processor device of claim 7, wherein the another media processor device comprises a plurality of another media processor devices.

9. The media processor device of claim 7, wherein the transmitting the playback file to the another media processor device comprises transmitting the playback file to the another media processor device via the media processor device network.

10. The media processor device of claim 1, wherein the operations further comprise transmitting descriptive information associated with the playback file to the another media processor device.

11. The media processor device of claim 10, wherein the descriptive information is presented by the another media processor device at the second electronic programming guide.

12. A non-transitory computer-readable storage medium comprising computer instructions which, responsive to being executed by a first media processor device including a processor, cause the first media processor device to perform operations, the operations comprising:
    receiving a plurality of operating commands that control presentation of a selected media content, wherein the selected media content is received from a server responsive to a selection, and wherein the selection is from a first electronic programming guide associated with the first media processor device;
    recording the plurality of operating commands to generate a playback file associated with the selected media content; and
    transmitting the playback file to a second media processor device, wherein the second media processor device is distinct from the first media processor device, wherein the second media processor device is configured to select the playback file and the selected media content from a second electronic programming guide associated with the second media processor device, and wherein the second media processor device is configured to present the selected media content according to the plurality of operating commands of the playback file.

13. The non-transitory computer-readable storage medium of claim 12, wherein the operations further comprise presenting the selected media content at a first display associated with the first media processor device according to the plurality of operating commands to generate a first viewing experience.

14. The non-transitory computer-readable storage medium of claim 13, wherein the second media processor device presents the selected media content at a second display associated with the second media processor device in order to recreate the first viewing experience at the second display.

15. The non-transitory computer-readable storage medium of claim 12, wherein:
    the second media processor device comprises a plurality of second media processor devices; and
    the first media processor device and the plurality of second media processor devices are part of a media processor device network.

16. A method comprising:
receiving, by a first media processor device, a selection of media content from a first electronic programming guide;
receiving, by the first media processor device, the media content from a server;
receiving, by the first media processor device, a plurality of operating commands for controlling a first presentation of the media content by the first media processor device at a first display device to generate a first viewing experience;
storing, by the first media processor device, a first playback file comprising a log of the plurality of operating commands; and
transmitting, by the first media processor device, the first playback file that is stored at the first media processor device to a second media processor device via a network, wherein the second media processor device is distinct from the first media processor device, wherein the second media processor device selects the first playback file and the media content from a second electronic programming guide, and wherein the second media processor device presents the media content at a second display device according to the plurality of operating commands of the first playback file to recreate the first viewing experience at the second display device.

17. The method of claim 16, wherein the first media processor device is accessed at the network by a first subscriber associated with the first media processor device and wherein the second media processor device is accessed at the network by a second subscriber associated with the second media processor device.

18. The method of claim 17, further comprising presenting by the first media processor device the media content at the first display device, which is associated with the first media processor device, according to the plurality of operating commands to generate the first viewing experience.

19. The method of claim 16, further comprising:
receiving by the first media processor device a second playback file comprising a second plurality of operating commands associated with second media content;
presenting by the first media processor device information from the second playback file in the first electronic programming guide; and
receiving by the first media processor device another selection from the first electronic programming guide of the information from the second playback file.

20. The method of claim 19, further comprising: presenting by the first media processor device the second media content at the first display device according to the second plurality of operating commands of the second playback file.

* * * * *